Oct. 16, 1928.

G. S. FOSNAUGH ET AL 1,687,860

SLUSH PUMP VALVE

Filed June 1, 1927

Inventors
George S. Fosnaugh.
Bernard Johnson.

By Lyon & Lyon Attorneys

Patented Oct. 16, 1928.

1,687,860

UNITED STATES PATENT OFFICE.

GEORGE S. FOSNAUGH AND BERNARD JOHNSON, OF NAPLES, CALIFORNIA.

SLUSH-PUMP VALVE.

Application filed June 1, 1927. Serial No. 195,637.

This invention relates to valves and particularly to valves that are subjected to hard usage, for example, slush valves of slush pumps. These pumps are used for pumping water or liquid mud, and the material passing through the pump frequently carries pebbles or small pieces of rock. These obstacles lodge upon the seats of the valves and cause considerable trouble by wearing out the seats and interfering with the tight closing of the valves. It has been attempted to employ gaskets of rubber or similar soft material, to insure tight seating of the valves, but these gaskets become macerated or "chewed up" by the repeated closing movement of the valve disk and are, therefore, generally unsatisfactory. The general object of the invention is to provide a valve of this type having a construction at its seat which will operate to prevent the permanent lodgement of small solid objects, such as pebbles or small pieces of rock, on the valve seat, and which will operate as a self-cleaning valve seat.

Further objects of the invention will appear hereinafter.

The invention consists of the novel parts and combination of parts to be described hereinafter, all of which contribute to produce an efficient slush pump valve.

A preferred embodiment of the invention is described in the following specification, while the broad scope of the invention is pointed out in the appended claims.

Figure 1:
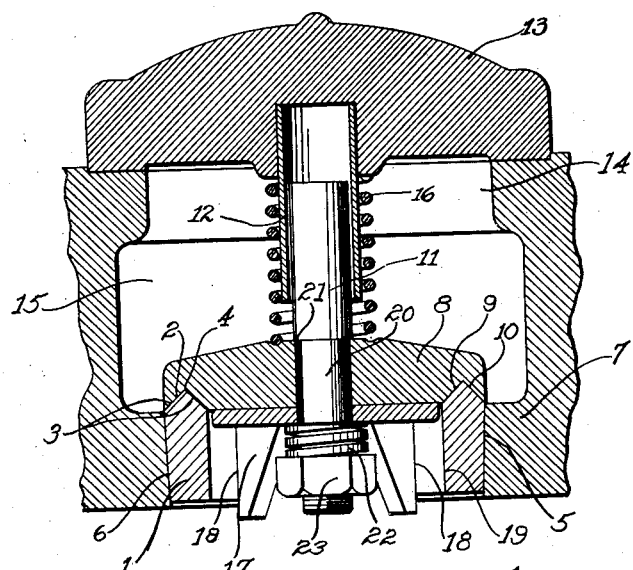
Figure 1 is a vertical section through a valve and a portion of a valve chest embodying our invention.
Figure 2:
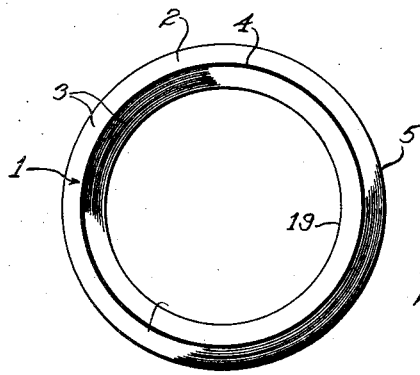
Figure 2 is a plan of our valve seat with the valve removed.

In practicing the invention, we provide a ring 1, the upper end of which constitutes the valve seat 2. The said seat is formed of two substantially conical faces 3 which intersect to form an annular ridge 4. This ring 1 is slightly tapered on its outer side, that is to say, it has a slightly conical outer face 5 which is received in a corresponding tapered bore 6 in the wall 7 of the pump. This taper is slight so that when the ring has been pressed firmly into place it will resist the high pressures developed under the valve.

The valve 8 reciprocates during the operation of the pump. It is in the form of a disk, the underside of which is provided with an annular groove 9. This groove is in the form of an inverted V and has conical faces 10 to fit against the conical faces 3. The valve 8 is attached to a stem 11 which passes up through a tubular guide 12 secured in the underside of a valve bonnet 13 which seats over the opening 14 in the outer wall of the valve chest 15, through which the valve may be inserted. A coil spring 16 is provided over the guide 12 which thrusts against the upper side of the valve 8 and presses it upon the seat. The underside of the valve 8 is provided with a guide 17 in the form of wings, the edges 18 of which engage the face of the cylindrical bore 19 of the ring.

The valve 8 is received on a neck 20 of reduced diameter on the stem 11 so that it is secured against an annular shoulder 21 on the stem. A coil spring or spring washer 22 is provided on the underside of the valve with a nut 23 which screws onto the threaded lower end of the stem. This spring washer yields when the nut is tightened up and assists in preventing the nut from coming loose.

The valve ring 1 and the valve disk 8 are made of hardened steel and the valve is used without any gasket. The result of this is that if any small objects such as pebbles, grit or small pieces of rock come onto the seat 3, they will be immediately ground up by the repeated closing movements of the valve. On account of the elevated ridge 4, it will be evident that the valve seat 3 is substantially self-cleaning and any material lodging on the seat will naturally gravitate down off of the seat. This is enhanced by the repeated closing movements of the valve as it descends onto its seat. In other words, the action of the valve is to grind up any hard material that lodges on the seat and eventually causes its gravitation off of the seat.

It is understood that the embodiment of the invention described herein is only one of the many embodiments this invention may take, and we do not wish to be limited in the practice of the invention, nor in the claims, to the particular embodiment set forth.

What we claim is:

1. In a valve for a slush pump to pump water carrying mud, sand and pebbles, the combination of an annular seat of hardened material having only two substantially conical faces intersecting to form an elevated ridge, and a valve-disk of hardened material having an annular groove on its under side with two substantially conical faces to come upon the said seat, said valve-disk having a guide stem, means for guiding the valve stem to permit the valve-disk to rise off its seat and return thereto, by the action of the pump, said valve-disk and seat cooperating when the valve rises and returns to its seat to crush the sand or pebbles lodging on the seat.

2. In a valve for slush pumps for pumping water carrying mud, sand and pebbles, the combination of a ring of hardened steel having an annular seat at its upper end, having substantially the cross section of an inverted V with only two substantially conical faces intersecting to form a ridge, a valve-disk having a substantially V-shaped groove with only two inclined faces to come upon said seat, said valve-disk having a guide stem extending from the same, and means for guiding the said stem to permit the valve-disk to rise off its seat and return thereto by the action of the pump, said disk and said seat cooperating to crush the pebbles and sand carried in the water and lodging on the said seat.

3. In a valve for a slush pump for pumping water carrying pebbles and sand, the combination of a hardened steel ring having an annular seat at its upper end having substantially the cross-section of an inverted V with only two substantially conical faces intersecting to form a ridge, a valve-disk having a substantially V-shaped groove on its under face to come upon the said seat, said disk having a guide-stem, means for guiding the said valve stem to permit the valve-disk to reciprocate and thereby move onto and away from the said seat, said disk and said seat cooperating in the reciprocation of the valve by the action of the pump, to crush sand and pebbles lodging between the groove and the seat, the said conical faces of the seat operating to guide material on the seat off of the same.

Signed at Los Angeles, this 18 day of May, 1927.

GEORGE S. FOSNAUGH.
BERNARD JOHNSON.